UNITED STATES PATENT OFFICE.

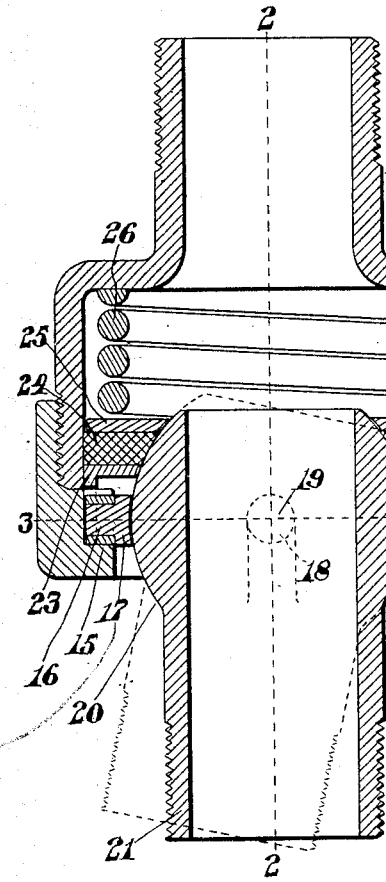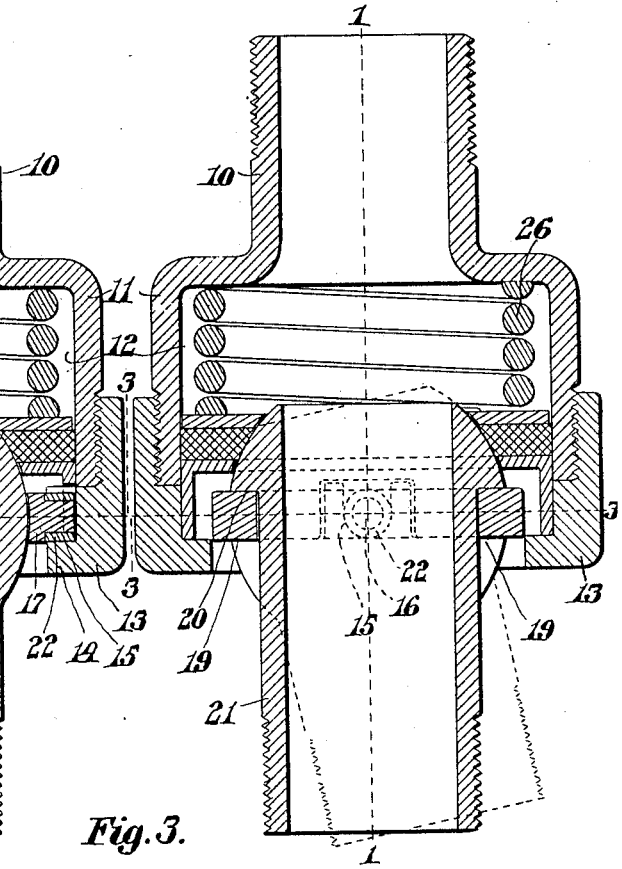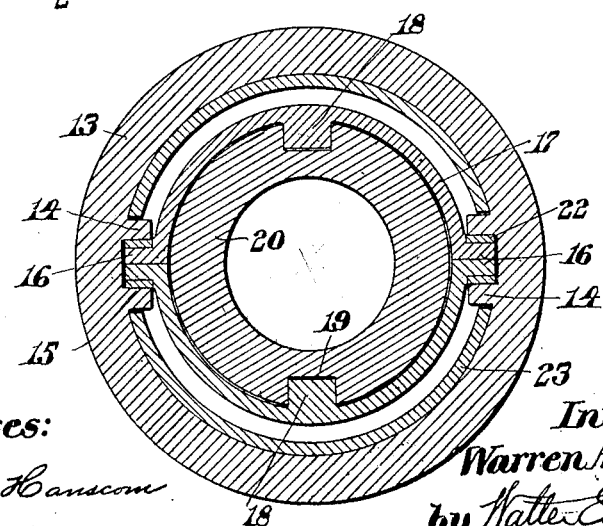

WARREN A. GREENLAW, OF MELROSE HIGHLANDS, MASSACHUSETTS, ASSIGNOR TO THE GREENLAW MANUFACTURING COMPANY, OF BOSTON, MASSACHUSETTS, A CORPORATION OF MAINE.

FLEXIBLE PIPE-JOINT.

No. 916,301.      Specification of Letters Patent.      Patented March 23, 1909.

Application filed April 23, 1908. Serial No. 428,878.

*To all whom it may concern:*

Be it known that I, WARREN A. GREENLAW, a citizen of the United States of America, and a resident of Melrose Highlands, in the county of Middlesex and State of Massachusetts, have invented certain new and useful Improvements in Flexible Pipe-Joints, of which the following is a specification.

This invention relates to flexible pipe joints and has for its object the production of a joint in which one of the members is pivotally supported in a ring provided with other pivotal extensions having seats in the other pipe member.

The invention consists in certain novel features of construction and arrangement of parts which will be readily understood by reference to the description of the drawings and to the claims hereinafter given.

Of the drawings: Figure 1 represents a section through a joint embodying the features of this invention. Fig. 2 represents a similar section through the joint, the cutting plane being on line 2—2 on Fig. 1, and Fig. 3 represents a transverse section of the same, the cutting plane being on line 3—3 on Figs. 1 and 2.

Similar characters designate like parts throughout the drawings.

In the drawings, 10 represents a pipe member provided with an enlarged end 11 having therein a chamber 12 of greater diameter than the diameter of the main portion 10 of said pipe member. Secured to the outer end of the enlarged end 11 is a cap 13 which has inwardly extending projections 14 in which are formed pockets 15 for the reception of the outwardly projecting trunnions 16 of a ring 17, this ring being provided with a pair of diametral inwardly extending trunnions 18 which are adapted to rest in pockets 19 formed in the face of the ball end 20 of the pipe member 21. The ring 17 is made in two parts connected together by means of the collars 22 surrounding the trunnions 16. The axes of the diametral inwardly projecting and outwardly projecting trunnions pass through the center of the ball end 20 so that any movement of the pipe member 21 to a different angle to the pipe member 10 will not vary the position of the center of the ball 20, the ball 20 moving about the trunnions 19 while at the same time the ring carrying the trunnions 19 is adapted to move about the axis of the trunnions 16, the combination of the two movements permitting the ball member to be moved to any desired angle relative to the socket member.

Within the chamber 12 is mounted a cup-shaped disk 23 upon which is superimposed the packing 24 on which an annular follower 25 rests. Between the follower 25 and the bottom of the chamber 12 is interposed a spring 26 which tends to force the packing 24 into contact with the outer face of the ball end 20 and the inner wall of the chamber 12 to effectually pack the joint and prevent leakage from the chamber 12.

It is believed that from the foregoing the operation and many advantages of a joint of this kind will be fully understood without further description.

Having thus described my invention, I claim:

1. In a flexible pipe joint, the combination with a ball member, a socket member, and a device for coupling these members; of a ring provided with diametral outwardly extending trunnions and diametral inwardly extending trunnions at right angles thereto; pockets in said ball for the reception of said inwardly projecting trunnions; and pockets in said coupling device for said outwardly extending trunnions.

2. In a flexible pipe joint, the combination with a ball member, a socket member, and a device for coupling these members; of a ring provided with diametral outwardly extending trunnions and diametral inwardly extending trunnions at right angles thereto; pockets in said ball for the reception of said inwardly projecting trunnions; and pockets in said coupling device for said outwardly extending trunnions, the axes of said trunnions passing through the center of said ball.

3. In a flexible pipe joint, the combination with a ball member, a socket, and a device for coupling these members; of a ring interposed between said ball member and socket member; diametral trunnions interposed between said ball and ring; and other diametral trunnions at right angles to those first named interposed between said ring and coupling device.

4. In a flexible pipe joint, the combination with a ball member, a socket, and a device for coupling these members; of a ring;

diametral trunnions interposed between said ball and ring; other diametral trunnions at right angles to those first named interposed between said ring and coupling device; a supporting cup-shaped ring; a packing; and a spring for forcing said packing into contact with said ball and the inner wall of said socket member.

5. In a flexible pipe joint, the combination with a ball member, a socket, and a device for coupling these members; of a ring; diametral trunnions interposed between said ball and ring; other diametral trunnions at right angles to those first named interposed between said ring and coupling device; a supporting cup-shaped ring; a packing; a spring for forcing said packing into contact with said ball and the inner wall of said socket member; and a follower between said spring and packing.

6. In a flexible pipe joint, the combination with a ball member, a socket member, and a device for coupling these members; of a divided ring provided with diametral half trunnions; collars over said half trunnions to secure together the two parts of the ring; seats for said collars in the coupling device; and trunnions interposed between said ring and ball at right angles to said divided trunnions.

Signed by me at 7 Water st., Boston, Mass., this 15th day of April, 1908.

WARREN A. GREENLAW.

Witnesses:
    EDNA C. CLEVELAND,
    NATHAN C. LOMBARD.